United States Patent [19]

Cheresnowsky

[11] Patent Number: 4,735,791

[45] Date of Patent: Apr. 5, 1988

[54] PROCESS FOR PRODUCING AMMONIUM MOLYBDATE FROM MOLYBDENUM TRIOXIDE

[75] Inventor: Michael J. Cheresnowsky, Towanda, Pa.

[73] Assignee: GTE Products Corporation, Stamford, Conn.

[21] Appl. No.: 33,707

[22] Filed: Apr. 3, 1987

[51] Int. Cl.[4] .............................................. C01G 39/02
[52] U.S. Cl. ...................................... 423/606; 423/56
[58] Field of Search ................. 423/56, 396, 397, 409, 423/606

[56] References Cited

U.S. PATENT DOCUMENTS

| | | | |
|---|---|---|---|
| 3,932,580 | 1/1976 | Vertes et al. | 423/56 |
| 3,963,823 | 6/1976 | Kulkarmi | 423/593 |
| 4,079,116 | 3/1978 | Ronzio et al. | 423/56 |
| 4,207,296 | 6/1980 | Nauta et al. | 423/606 |
| 4,525,331 | 6/1985 | Cheresnowsky | 423/606 |
| 4,555,386 | 11/1985 | Cheresnowsky | 423/56 |
| 4,596,701 | 6/1986 | Cheresnowsky et al. | 423/61 |
| 4,601,890 | 7/1986 | Cheresnowsky | 423/54 |
| 4,604,267 | 8/1986 | Cheresnowsky | 423/606 |
| 4,612,172 | 9/1986 | Brunelli et al. | 423/593 |

Primary Examiner—Helen M. S. Sneed
Assistant Examiner—Anthony McFarlane
Attorney, Agent, or Firm—Donald R. Castle; L. Rita Quatrini

[57] ABSTRACT

A process is disclosed for producing ammonium molybdate from molybdenum trioxide which involves digesting molybdenum trioxide with ammonia in a sealed vessel equipped with one or more stirrers at a temperature of from about 20° C. to about 80° C., with the amount of ammonia being equal to the stoichiometric amount needed to form normal ammonium molybdate, up to about 2.9 times this stoichiometric amount, to form an ammonium molybdate solution containing essentially all of the starting molybdenum; followed by separating the solution from any insolubles. The method is especially useful for molybdenum containing iron as an impurity. Essentially all of the iron reports with the insolubles.

2 Claims, No Drawings

PROCESS FOR PRODUCING AMMONIUM MOLYBDATE FROM MOLYBDENUM TRIOXIDE

This invention relates to a process for producing ammonium molybdate from molybdenum trioxide by a digestion process with ammonia which is carried out in a hermetically sealed vessel with one or more stirrers to result in complete conversion to ammonium molybdate and complete removal of iron if iron is present.

BACKGROUND OF THE INVENTION

Prior ammonia digestion processes to produce ammonium molybdate from molybdenum trioxide involve the use of open vessels which allow ammonia to escape to the air. As a result, large amounts of ammonia are needed to accomplish the conversion to ammonium molybdate. For example, it is typical to use in excess of 3 times the stoichiometric amount needed to produce ammonium molybdate. This adds significantly to the cost of the process.

According to the present invention, sealed tanks are used for the digestion, and the amount of ammonia that is used is significantly reduced. Furthermore, the recovery of molybdenum is essentially 100% efficient.

SUMMARY OF THE INVENTION

In accordance with one aspect of this invention, there is provided a process for producing ammonium molybdate from molybdenum trioxide which involves digesting molybdate trioxide with ammonia in a sealed vessel equipped with one or more stirrers at a temperature of from abouat 20° C. to about 80° C., with the amount of ammonia being equal to the stoichiometric amount needed to form normal ammonium molybdate, up to about 2.9 times this stoichiometric amount, to form an ammonium molybdate solution containing essentially all of the starting molybdenum; followed by separating the solution from any insolubles. The method is especially useful for molybdenum containing iron as an impurity. Essentially all of the iron reports with the insolubles.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The starting material is molybdenum trioxide which can be either pure or impure.

The digestion is carried out in a sealed vessel which is equipped with one or more stirrers. The vessel can be any commercial vessel capable of being closed or hermetically sealed which can accommodate slightly elevated pressures. The digestion is carried out with agitation by means of the stirrer or stirrers.

A book entitled "Metallurgy of Rare Metals", by A. N. Zelikman, 1966, No. N66-37137, U.S. Department of Commerce, National Technical Information Service, page 83, describes leaching of molybdenum trioxide to form ammonium molybdate. The use of a sealed vessel is described, however, if the vessel had a stirrer, it was not sealed. Furthermore, complete conversion of the molybdenum to ammonium molybdate is not accomplished in one leaching step but in three or four successive processing stages. This differs from the present invention in that the present process involves use of a sealed vessel equipped with a stirrer. As a result, there is complete conversion to ammonium molybdate without excessive consumption of ammonia.

According to the present invention, the molybdenum trioxide is digested with ammonia or ammonium hydroxide. The amount of ammonia can range from the stoichiometric amount needed to form normal ammonium molybdate to about 2.9 times this stoichiometric amount. Most preferably the amount of ammonia is equal to slightly more that the stoichiometric amount such as 1.01 times stiochiometry to 1.8 times stoichiometry. The stoichiometric amount is 2 moles of ammonia per mole of molybdenum trioxide. These amounts of ammonia are significantly lower than that used in prior art processing in open vessels. Prior amounts could be as high as three times the stoichiometric amount or higher. Under the conditions of the present invention, the essentially complete precipitation of iron, if any is present, is accomplished. Also, the subsequent removal of contaminating cations with a chelating resin is facilitated if this step later proves to be necessary. The levels of ammonia which are required in this process are advantageous because excessive ammonia can cause formation of undesirable ammine complexes. Also excessive ammonia poses environmental problems. If the amount of ammonia is too low, that is below stoichiometry, the iron does not precipitate, but remains in solution and eventually contaminates the molybdenum. Also, the recovery of molybdenum is poor.

The digestion temperatures are in the range of about room temperature, that is about 20° C. to about 80° C., and preferably from about 50° C. to about 60° C. At these temperatures in a sealed vessel, the pressures are slightly elevated. For example, in actual processing, the pressures that result range from about 0.5 to about 15 PSIG and most typically from about 2 to about 8 PSIG. Typically the digestion time is about 2 hours.

One advantage of this process is that essentially all of the molybdenum is converted to molybdenum trioxide even with the reduced amount of ammonia. Furthermore, ammonia is saved over a broad range of molybdenum concentrations, temperatures, and digestion times.

Another advantage of this process is that there is no sacrifice in purity of the ammonium molybdate even with the reduced amount of ammonia. The present invention is especially suited to removal of iron from impure molybdenum trioxide. The iron is removed as insoluble residue. The iron levels in subsequently produced molybdenum products such as ammonium dimolybdate contain no greater than about 6 ppm Fe on a $MoO_3$ weight basis.

The ammonium molybdate solution obtained as a result of the digestion is separated from any insolubles that can form, by standard methods such as filtration. These insolubles are typically sludges which can contain silicon dioxide, iron, and other impurities.

The ammonium molybdate solution can now be evaporated to dryness to obtain ammonium dimolybdate as a solid product, or crystal crops of ammonium dimolybdate can be taken.

If there are high concentrations of contaminating cations in the ammonium molybdate solution, the solution can first be contacted with a chelating cation exchange resin prior to the evaporation step. Typical chelating cation exchange resins are imminodiacetate type such as supplied by Mobay company under the trade name of TP207. In this process, cations such as those of aluminum, calcium, copper, magnesium, etc. are exchanged for the ammonium cation of the resin.

The ammonium dimolybdate can then be processed by known reduction processes to obtain molybdenum dioxide and molybdenum metal.

To more fully illustrate this invention, the following nonlimiting example is presented.

EXAMPLE

Digestions are carried out using two technical grade oxides: Molymet, and Anaconda. The method is described below.

About 500 g of the oxide which had been previously acid leached to prepurify it, is stirred with about 1700 ml of ammonium hydroxide in a hermetically sealed one gallon pressure vessel. The digestions are carried out with high ammonia solutions and with low ammonia solutions. The temperatures are from about 40° to about 70° C. The stir rate is about 500 rpm. The digestion time is about 2 hours, and the pressures are recorded during the digestion tests. The resulting ammonium molybdate solution is separated from the digestion sludge. Ammonium dimolybdate (ADM) is made by evaporating the ammonium molybdate solution to dryness. The ADM is analyzed for impurities. The impurities of Fe(II), Ni, and Cr(III) are of interest because they form ammine complexes. The sludge is used to calculate the percent of molybdenum recovered.

Control digestions in which open beakers and high ammonia solutions are used are carried out with Molymet and Anaconda molybdenum oxides. About 75 g of acid leached molybdenum oxide is slurried in about 250 ml of about 21% by weight ammonia solution for about 2 hours at from about 50° to about 60° C. Ammonia is added after about 1 hour and at the end of the digestion to keep the pH at from about 9.5 to 9.9. The slurry is then processed as described above to obtain ammonium dimolybdate (ADM).

The results of the tests are given in Tables 1 and 2. The controls which represent the old method are listed first. The test data representing the process of the present invention, then follow.

As shown in the "NH$_3$ RATIO" column in Table 1, ammonia use is reduced from 3 to 4 times stoichiometry in the prior method to about 1.03 times stoichiometry for the method of the present invention. This ratio is moles of ammonia used divided by moles of ammonia theoretically needed. Two moles of ammonia react with one mole of molybdenum trioxide. Because ammonia is not lost, it takes less ammonia to produce the ammonium molybdate (AM) solution while the desired pH is maintained. The effects of the reduced amounts of ammonia on other variables are seen in Table 2.

1. Recovery of molybdenum in the Tests of the present invention is comparable to the prior method controls. Molybdenum recovery does not decline even as ammonia content approaches stoichiometry.

2. Pressures are typically from about 4 to 7 PSIG. The only "high" pressure is in Test 1, in which about 21% by weight is used. As ammonia concentration decreases in subsequent tests, pressure also decreases.

3. The purity of the ADM product in the Tests is as good as the purity in the Controls. Only Test 1, which is high ammonia and pressure gives more iron, nickel, and chromium. It is believed that the combination of the high pressure and high ammonia causes ammine-complex formation with these impurities. As ammonia concentration and pressure decrease in latter Tests, Test purity compares favorably with Control purity.

TABLE 1

Amounts of Ammonia Used

|  | Oxide | Moles MoO$_3$ | Theoretical Moles NH$_4$OH | Actual Moles NH$_4$OH | NH$_3$ RATIO*** | AM Solution pH* |
|---|---|---|---|---|---|---|
| Control | Molymet | 0.321 | 0.642 | 2.61** | 4.07 | 10.2 |
| Control | Anaconda | 0.50 | 1.00 | 3.6** | 3.6 | 10.0 |
| Test 1 | Molymet | 3.14 | 6.28 | 18.5 | 2.94 | 10.6 |
| Test 2 | Molymet | 3.20 | 6.40 | 11.2 | 1.75 | 10.0 |
| Test 3 | Molymet | 3.20 | 6.40 | 10.2 | 1.59 | 9.9 |
| Test 4 | Molymet | 3.20 | 6.40 | 8.70 | 1.36 | 9.2 |
| Test 5 | Molymet | 3.20 | 6.40 | 7.98 | 1.24 | 9.4 |
| Test 6 | Molymet | 3.20 | 6.40 | 7.62 | 1.19 | 9.4 |
| Test 7 | Anaconda | 3.31 | 6.62 | 7.25 | 1.10 | 9.3 |
| Test 8 | Anaconda | 3.31 | 6.62 | 6.82 | 1.03 | 9.1 |

*pH measured at room temperature.
**Includes total ammonia, that is, ammonia in starting solution plus ammonia added to raise the pH during digestion.
***Ratio of actual moles of NH$_4$OH to theoretical moles of NH$_4$OH.
Test 7 - the ammonia concentration is 7.6% by wt. or 4M.
Test 8 - the ammonia concentration is 7.3% by wt.

TABLE 2

Digestion Data And Other Variables

|  | Oxide | Temp. °C. | Max. PSIG | % Mo eff. | (product (MoO$_3$) purity) ppm Fe | ppm Ni | ppm Cr |
|---|---|---|---|---|---|---|---|
| Control | Molymet | 50–60 |  | 99.9 | <3 | <2 | <3 |
| Control | Anaconda | 50–60 |  | 99.7 | 6 | <2 | 3 |
| Test 1 | Molymet | 50–75 | 19 | 99.9 | 63 | 6 | 8 |
| Test 2 | Molymet | 50–60 | 5 | 99.8 | <3 | <2 | <3 |
| Test 3 | Molymet | 53–62 | 5 | 99.9 | 4 | 3 | <3 |
| Test 4 | Molymet | 56–73 | 7 | 99.9 | <3 | 3 | <3 |
| Test 5 | Molymet | 49–69 | 5 | 99.9 | 3 | 2 | <3 |
| Test 6 | Molymet | 41–69 | 4 | 99.9 | 3 | 3 | <3 |
| Test 7 | Anaconda | 37–62 | 3 | 99.7 | <3 | 3 | 4 |

TABLE 2-continued

| | | Digestion Data And Other Variables | | | (product (MoO$_3$) purity) | | |
|---|---|---|---|---|---|---|---|
| | Oxide | Temp. °C. | Max. PSIG | % Mo eff. | ppm Fe | ppm Ni | ppm Cr |
| Test 8 | Anaconda | 40–69 | 4 | 99.8 | <3 | 2 | 3 |

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing ammonium molybdate from molybdenum trioxide having iron as an impurity, said process comprising:
   (a) digesting said molybdenum trioxide with ammonia in a sealed vessel which is equipped with one or more stirrers at a temperature of from about 50° C. to about 60° C., at a pressure of from about 0.5 psig to about 15 psig, with the amount of ammonia being equal to from about 1.01 to about 1.8 times the stoichiometric amount needed to form normal ammonium molybdate, to form an ammonium molybdate solution containing essentially all of the starting molybdenum and a digestion residue containing essentially all of the iron; and
   (b) separating said solution from said residue.

2. A process for producing ammonium molybdate from molybdenum trioxide, said process comprising:
   (a) digesting said molybdenum trioxide with ammonia in a sealed vessel which is equipped with one or more stirrers at a temperature of from about 50° C. to about 60° C., at a pressure of from about 0.5 psig to about 15 psig, with the amount of ammonia being equal to from about 1.01 to about 1.8 times the stoichiometric amount needed to form normal ammonium molybdate, to form an ammonium molybdate solution containing essentially all of the starting molybdenum; and
   (b) separating said solution from any insoluble material.

* * * * *